US010983886B2

(12) United States Patent
Savino et al.

(10) Patent No.: US 10,983,886 B2
(45) Date of Patent: *Apr. 20, 2021

(54) METHODS, APPARATUSES AND SYSTEMS FOR CLOUD-BASED DISASTER RECOVERY

(71) Applicant: Storage Engine, Inc., Tinton Falls, NJ (US)

(72) Inventors: Trevor Savino, Seymour, CT (US); James Patrick Hart, Brick, NJ (US); Justin Furniss, Egg Harbor City, NJ (US); Charles Wooley, Sea Girt, NJ (US)

(73) Assignee: Storage Engine, Inc., Tinton Falls, NJ (US)

( * ) Notice: Subject to any disclaimer, the term of this patent is extended or adjusted under 35 U.S.C. 154(b) by 177 days.

This patent is subject to a terminal disclaimer.

(21) Appl. No.: 16/224,356

(22) Filed: Dec. 18, 2018

(65) Prior Publication Data

US 2020/0192773 A1 Jun. 18, 2020

(51) Int. Cl.
*G06F 11/00* (2006.01)
*G06F 11/20* (2006.01)
(Continued)

(52) U.S. Cl.
CPC ...... *G06F 11/2097* (2013.01); *G06F 11/1461* (2013.01); *G06F 11/1464* (2013.01);
(Continued)

(58) Field of Classification Search
CPC ............. G06F 11/2097; G06F 11/1461; G06F 11/1464; G06F 11/1471; G06F 11/1687
See application file for complete search history.

(56) References Cited

U.S. PATENT DOCUMENTS 7,321,918 B2 1/2008 Burd et al.
7,634,679 B2 * 12/2009 Quintiliano ......... G06F 11/1662
714/12
(Continued)

FOREIGN PATENT DOCUMENTS

CN 101309167 A 11/2008
CN 201479165 U 5/2010
(Continued)

OTHER PUBLICATIONS

Stankovic "What is a SQL Server disaster recovery?", SQLShack, Mar. 14, 2014.
(Continued)

*Primary Examiner* — Elmira Mehrmanesh
(74) *Attorney, Agent, or Firm* — Moser Taboada

(57) ABSTRACT

Methods, apparatuses and systems for cloud-based disaster recovery are provided. The method, for example, includes receiving, at a cloud-based computing platform, backup information associated with backup vendors used by a client machine; storing, at the cloud-based computing platform, the backup information associated with the backup vendors; periodically updating, at the cloud-based computing platform, the backup information associated with each of the backup vendors at a predetermined polling interval for each of the backup vendors; receiving, at the cloud-based computing platform from the client machine, a failure indication for a server associated with at least one of the backup vendors; and restoring the server using the stored backup information at the cloud-based computing platform.

20 Claims, 5 Drawing Sheets

(51) Int. Cl.
*G06F 11/14* (2006.01)
*H04L 29/14* (2006.01)
*G06F 11/16* (2006.01)

(52) U.S. Cl.
CPC ...... *G06F 11/1471* (2013.01); *G06F 11/1687* (2013.01); *H04L 69/40* (2013.01)

(56) References Cited

U.S. PATENT DOCUMENTS

| | | | |
|---|---|---|---|
| 8,065,559 B2 | 11/2011 | Kamath et al. | |
| 8,387,114 B2 | 2/2013 | Sugarbroad | |
| 8,812,904 B2 | 8/2014 | Kamath et al. | |
| 8,819,476 B2 | 8/2014 | Roth et al. | |
| 8,849,955 B2* | 9/2014 | Prahlad | G06Q 50/188 709/219 |
| 8,909,977 B2 | 12/2014 | Morosan et al. | |
| 9,300,633 B2 | 3/2016 | Acharya et al. | |
| 9,336,103 B1 | 5/2016 | Hasbe et al. | |
| 9,501,361 B2 | 11/2016 | Bates | |
| 9,525,592 B2 | 12/2016 | Tung | |
| 9,558,076 B2 | 1/2017 | Durge et al. | |
| 9,575,798 B2 | 2/2017 | Terayama et al. | |
| 9,894,098 B2 | 2/2018 | Sabin | |
| 9,934,054 B2 | 4/2018 | Baset et al. | |
| 9,940,203 B1* | 4/2018 | Ghatnekar | G06F 16/13 |
| 10,228,962 B2* | 3/2019 | Dornemann | G06F 11/2038 |
| 2009/0019137 A1* | 1/2009 | Mishra | H04L 41/5054 709/220 |
| 2010/0293147 A1 | 11/2010 | Snow et al. | |
| 2011/0161723 A1 | 6/2011 | Taleck et al. | |
| 2013/0103834 A1 | 4/2013 | Dzerve et al. | |
| 2013/0166511 A1* | 6/2013 | Ghatty | G06F 11/1469 707/649 |
| 2014/0101111 A1* | 4/2014 | Sengupta | G06F 11/2094 707/654 |
| 2014/0245423 A1 | 8/2014 | Lee | |
| 2014/0289797 A1 | 9/2014 | Trani | |
| 2015/0229638 A1 | 8/2015 | Loo | |
| 2015/0269237 A1* | 9/2015 | Ries | G06F 11/1458 707/654 |
| 2016/0077926 A1* | 3/2016 | Mutalik | G06F 11/1453 711/162 |
| 2016/0117231 A1 | 4/2016 | Lee et al. | |
| 2017/0099188 A1 | 4/2017 | Chang et al. | |
| 2017/0149585 A1 | 5/2017 | Norris et al. | |
| 2018/0198754 A1 | 7/2018 | Kielhofner et al. | |
| 2020/0192762 A1* | 6/2020 | Savino | G06F 11/1464 |
| 2020/0192763 A1* | 6/2020 | Savino | G06F 11/1469 |
| 2020/0192767 A1* | 6/2020 | Savino | H04L 67/1097 |
| 2020/0195491 A1* | 6/2020 | Savino | H04L 43/50 |
| 2020/0195513 A1* | 6/2020 | Savino | H04L 41/12 |
| 2020/0195712 A1* | 6/2020 | Savino | G06F 11/1464 |
| 2020/0195713 A1* | 6/2020 | Savino | H04L 63/10 |
| 2020/0195714 A1* | 6/2020 | Savino | H04L 69/40 |

FOREIGN PATENT DOCUMENTS

| | | |
|---|---|---|
| CN | 102932407 A | 2/2013 |
| CN | 104767643 A | 7/2015 |
| CN | 106982259 A | 7/2017 |
| CN | 108234191 A | 6/2018 |
| CN | 108632057 A | 10/2018 |
| EP | 2251783 A1 | 11/2010 |
| JP | 2012068771 A | 4/2012 |
| KR | 20150121891 A | 10/2015 |
| KR | 101628195 B1 | 6/2016 |
| WO | WO-2007111086 A1 | 10/2007 |
| WO | WO-2009155680 A1 | 12/2009 |
| WO | WO-2015109804 A1 | 7/2015 |
| WO | WO-2017161979 A1 | 9/2017 |

OTHER PUBLICATIONS

Alcântara et al "GINJA: One-dollar Cloud-based Disaster Recovery for Databases", Middleware '17, Dec. 11-15, 2017, Las Vegas, NV, USA.

"ACRONIS® Disaster Recovery as a Service", ACRONIS, Downloaded from web site http://dl.acronis.com/u/pdf/Acronis-DRaaS_datasheet_en-US.pdf.

International Search Report for Application No. PCT/US2019/065379 dated Apr. 7, 2020.

\* cited by examiner

METHODS, APPARATUSES AND SYSTEMS FOR CLOUD-BASED DISASTER RECOVERY

FIELD

The disclosure generally relates to methods, apparatuses and systems for cloud-based disaster recovery, and more particularly, to methods, apparatuses and systems for managing backup solutions for data backup and recovery of servers.

BACKGROUND

Client workstations within an organization's work facilities use one or more servers to perform various operations associated with the organization. Data on a server can be backed up using one or more backup solutions provided by a backup vendor associated with the server, so that if that server should become inoperable, e.g., crash, become corrupted, or destroyed, the server can be restored to a point in time in a relatively quick manner. Additionally, restoring a server sometimes requires manual/user intervention, which can be quite challenging and/or time consuming for a user in view of the complexity of the backup solutions. As can be appreciated, the more servers that become inoperable, the more time it will take to restore them, as each server has its own unique backup solution.

Accordingly, there is a need for methods, apparatuses and systems for managing backup solutions for data backup and recovery of servers.

SUMMARY

Methods, apparatuses and systems for managing backup solutions for data backup and recovery of servers are disclosed herein.

In accordance with an aspect of the disclosure, there is provided a method for cloud-based disaster recovery. The method includes receiving, at a cloud-based computing platform, backup information associated with backup vendors used by a client machine; storing, at the cloud-based computing platform, the backup information associated with the backup vendors; periodically updating, at the cloud-based computing platform, the backup information associated with each of the backup vendors at a predetermined polling interval for each of the backup vendors; receiving, at the cloud-based computing platform from the client machine, a failure indication for a server associated with at least one of the backup vendors; and restoring the server using the stored backup information at the cloud-based computing platform.

In accordance with an aspect of the disclosure, there is provided a nontransitory computer readable storage medium having stored thereon instructions that when executed by a processor perform a method for cloud-based disaster recovery. The method includes receiving, at a cloud-based computing platform, backup information associated with backup vendors used by a client machine; storing, at the cloud-based computing platform, the backup information associated with the backup vendors; periodically updating, at the cloud-based computing platform, the backup information associated with each of the backup vendors at a predetermined polling interval for each of the backup vendors; receiving, at the cloud-based computing platform from the client machine, a failure indication for a server associated with at least one of the backup vendors; and restoring the server using the stored backup information at the cloud-based computing platform.

In accordance with an aspect of the disclosure, there is provided a cloud-based server of a cloud-based computing platform. The cloud-based server includes a processor and a memory coupled to the processor and having stored thereon instructions that when executed by the processor configure the cloud-based server to receive, at a cloud-based computing platform, backup information associated with backup vendors used by a client machine; store, at the cloud-based computing platform, the backup information associated with the backup vendors; periodically update, at the cloud-based computing platform, the backup information associated with each of the backup vendors at a predetermined polling interval for each of the backup vendors; receive, at the cloud-based computing platform from the client machine, a failure indication for a server associated with at least one of the backup vendors; and restore the server using the stored backup information at the cloud-based computing platform.

BRIEF DESCRIPTION OF THE DRAWINGS

The above and other aspects, features and advantages of certain embodiments of the disclosure will be more apparent from the following detailed description taken in conjunction with the accompanying drawings, in which.

Figure 1:
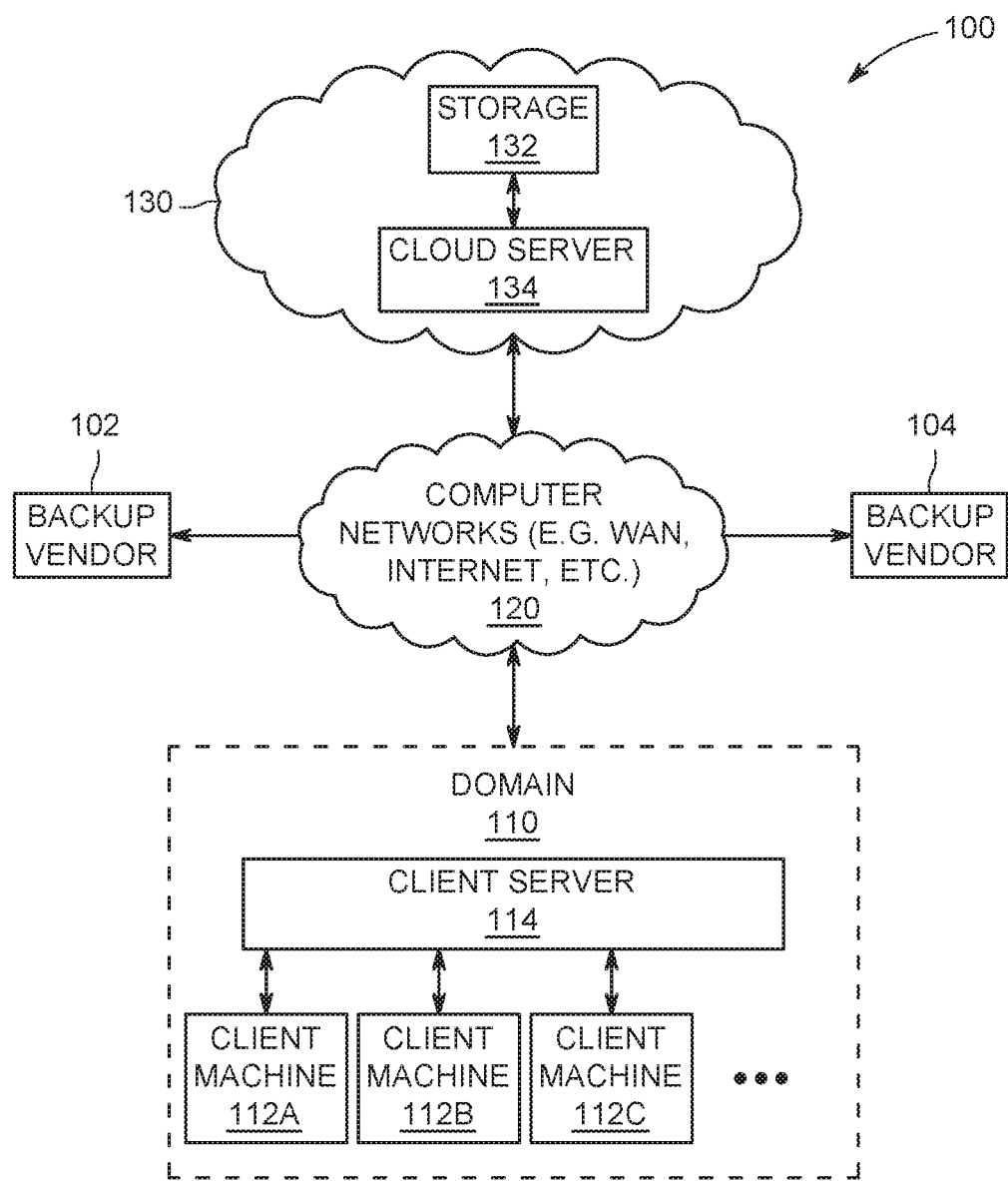
FIG. 1 is a diagram of a cloud-based disaster recovery system that uses a web-based application, in accordance with an embodiment of the disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the disclosure. In the description of the drawings, similar reference numerals are used for similar elements.

A backup, or the process of backing up, can refer to the copying and/or archiving of computer data so the copied data can be used to restore the original after a data loss event. Backup solution refers to a solution used by a backup vendor. Backup set refers to multiple backups.

Cloud computing can refer to computing that can involve a large number of computers connected through a communication network such as the Internet. Cloud computing can be a form of distributed computing over a network, and can include the ability to run a program or application (e.g., a web application) on many connected computers at the same time.

Cloud storage can refer to a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Disaster Recovery as a service (DRaaS) can refer to the use of physical machines, virtual machines, and/or other resources to perform disaster recovery offered with a cloud-service model.

Virtual machine (VM) can refer to a software-based emulation of a computer. Virtual machines can operate based on the computer architecture and functions of a computer.

Workload as used herein can refer to groups of machines including, for example, servers, networks, firewalls, etc., and all other devices and interconnections between the groups of machines of a client site or sites. For example, a workload can include servers that must be running for a corresponding business function (e.g., web-based application services, accounting services, sales systems, public website, etc.) to be available at the client site. Servers can be organized within a workload in groups called workload steps which allow a user (e.g., a creator of the workload) to specify when an order of servers being restored is important.

FIG. 1 is a diagram of a cloud-based disaster recovery system 100 (system 100) that uses a web-based application, in accordance with an embodiment of the disclosure. The system 100 can provide DRaaS and can be used for data backup and recovery of servers used by client workstations, e.g., for cloud-based recovery of the servers in the event of a disaster.

The system 100 includes a client domain 110, at least one computer network 120 and a cloud-based computing platform 130. The client domain 110 includes at least one client machine/device 112A-112O (hereinafter collectively referred to as client machines 112) and an onsite client server 114, which partitions tasks between the client machines 112 and one or more service providers, i.e., servers.

The cloud-based computing platform 130 includes a cloud-based storage device 132 (storage 132) and at least one cloud-based server 134 (cloud server 134). The cloud-based computing platform may also include a virtual machine representing virtualized client workloads. The cloud-based computing platform 130 communicates with the client domain 110 via a computer network 120, which can be a wide-area network (WAN), an Internet and other networks implemented for communication by the client domain 110; a more detailed description of the computer network 120 is described below. In addition, while the storage 132 is illustrated as a single, physical device, the storage 132 can span multiple servers and can be accessed by clients over the internet.

The client domain 110 including the client machines 112 can represent a client workload including servers, networks, firewalls, etc., and all other machines and interconnections of a client domain or domains 110.

A client in the client domain 110 can interact via a user interface of the client server 114 through the computer network 120 with a web-based application and executed via, for example, the at least one cloud server 134 of the cloud-based computing platform 130.

For example, a web-based application as described herein can be used at the cloud server 134 to manage backup information (e.g., backup solutions, backups, backup sets, etc.) provided by one or more backup vendors 102, 104, which are used locally by the client machines 112 at the client domain 110. The backup vendors 102, 104, using the backup information, are configured to restore one or more respective servers 102a, 104a. For illustrative purposes, the servers 102a, 104a are shown including multiple servers in FIG. 2. The backup information can also include other information (e.g., information relating to a previous restore of a server) associated with the backup vendors 102, 104 and/or the servers 102a, 104a. Thus, if the servers 102a, 104a become inoperable, e.g., crash, become corrupted, or destroyed, backup sets stored and managed at/by the cloud server 134 can be used to restore the inoperable servers 102a, 104a back to an original or operable environment. The backup vendors 102, 104 can be products of, for example, Dell EMC, Google, Veritas, Commvault, IBM, etc. While two backup vendors 102, 104 are shown in the FIGS., more or fewer backup vendors 102, 104 can be used by the client machines 112.

Figure 2:
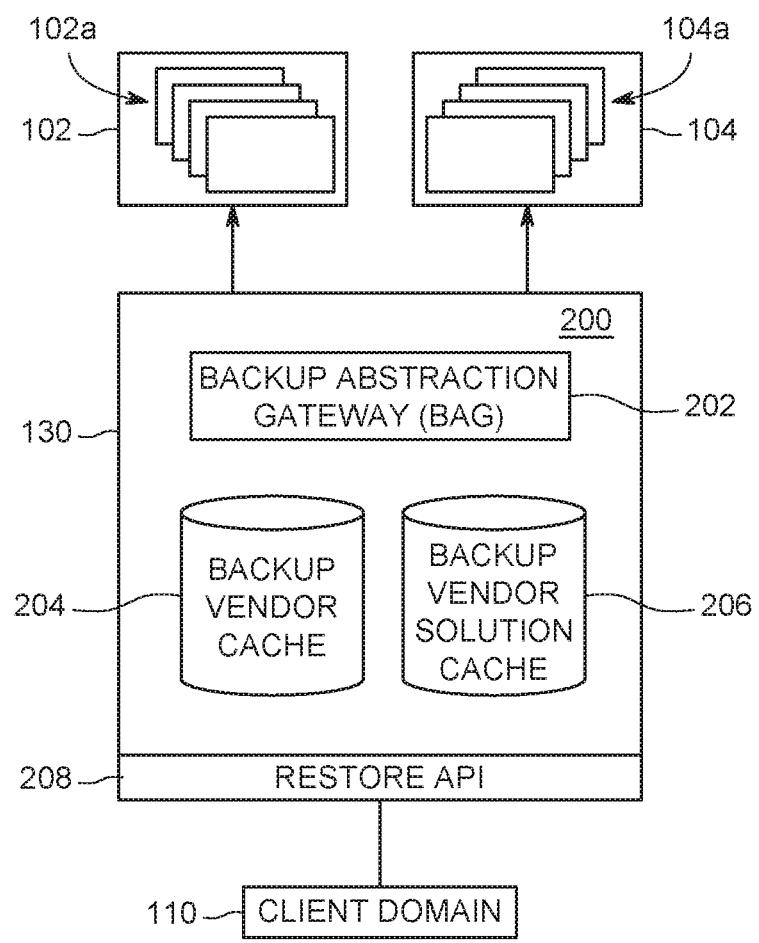
FIG. 2 is a diagram of a cloud-based computing platform including the web-based application for restoring one or more servers used in a client domain, in accordance with an embodiment of the disclosure.

FIG. 2 is a diagram of the cloud-based computing platform 130 including a web-based application 200 for restoring one or more servers (e.g., the servers 102a, 104a) used in the client domain 110, in accordance with an embodiment of the disclosure. The web-based application 200 includes a backup abstraction gateway (BAG) 202 that communicates directly with the backup vendors 102, 104 to obtain, for example, backups (e.g., a duplicate or clone of data that was present on the servers 102a, 104a prior to the servers 102a, 104a becoming inoperable or corrupted) used for restoring the servers 102a, 104a. Once the BAG 202 obtains the backups (or backup sets) for the servers 102a, 104a, the BAG 202 stores/manages the backups.

Particularly, the BAG 202 compiles a listing of the various backups (or backup sets) for each of the servers 102a, 104a, and stores the compiled listing of backups for each backup vendor 102, 104 locally in the cloud-based computing platform 130. More particularly, the BAG 202 compiles the listings of backups for each backup vendor 102, 104 in one or more data look-up tables using identification (ID) information (e.g., names or other ID information) of all of the backup vendors 102, 104 including the servers 102a, 104a that are being managed and their corresponding backup information including the backup solutions, backups, backup sets, etc. to local cache. For illustrative purposes, a list of backup vendors (e.g., the backup vendors 102, 104) and their corresponding servers (e.g., the servers 102a, 104a) are stored in a backup vender cache 204, and a list of corresponding backup vendor solutions, backups, backup sets, etc. are stored in a backup vendor solution cache 206. The information contained in the backup vendor cache 204 and the backup vendor solution cache 206 can be also stored in the storage 132 for access thereof by a user via the user interface provided at the client domain 110 (e.g., at the client server 114 and/or the client machines 112), to view, remove, or make changes to the information contained therein.

After the BAG 202 compiles, for example, the backup sets for each backup vendor 102, 104, the BAG 202 maintains communication with the backup vendors 102, 104 to obtain updates, if available, for the stored backup sets for each of the backup vendors 102, 104. For example, the BAG 202 can query the backup vendors 102, 104 at a predetermined polling or time interval, which can be set by a user, or a factory default setting can be used. For example, the user can set the BAG 202 to use a polling interval of 1, 5, 10, minutes (or seconds, hours, days, weeks, etc.), or other suitable polling interval, to ensure that the backup sets for the servers 102a, 104a of the backup vendors 102, 104 are up to date. The times at which the updates for the backup sets are performed by the BAG 202 for the backup vendors 102, 104 can be the same or different. For example, the BAG 202 can update the backup sets for the backup vendor 102 at a first polling/time interval and can update the backup vendor 104 at a second polling/time interval that is different from the first polling/time interval. A user can adjust/change a polling/time interval at which the BAG 202 performs the scheduled updates using the user interface at the client machines 112.

The BAG 202 can store information relating to a previous restore of the servers 102a, 104a. For example, the information can include a date of a previous restore of the servers 102a, 104a, a size of a previous restore of the servers 102a, 104a, an outcome of a previous restore of the servers 102a, 104a (e.g., whether the previous restore of the servers 102a, 104a was successful/unsuccessful), a type of restore of a previous restore of the servers 102a, 104a (e.g., in-place or out-of-place, as described in greater detail below), and a time required to complete a restore using a backup. Thus, a user can determine whether to use a previous backup based on the information of a previous restore of the servers 102a, 104a.

Additionally, the BAG 202 can also store information relating to a previously restored backup. For example, the information relating to a previously restored backup can include a type of the backup (e.g., whether a backup is incremental, differential, full, application based, is for a VM, is for an operating system, etc.). The information relating to a previously restored backup can further include whether a backup used was successful/unsuccessful, various metadata including, but not limited to a size of the backup, a time required to complete a restoration of a server using the backup, etc.

The BAG 202 can store information relating to network information of the servers 102a, 104a, for example, hostname information of the servers 102a, 104a and configuration/type information of the servers 102a, 104a, e.g., database servers, file servers, sharepoint servers, web servers, etc.

The information relating to previous restores of the servers 102a, 104a, relating to previously restored backups, and network information of the servers 102a, 104a can be stored in local cache (e.g., the backup vendor solution cache 206) of the BAG 202 or the storage 132.

The BAG 202 communicates with a restore application programming interface (API) 208 of the web-based application 200. The restore API 208 receives a request from the client domain 110 for restoring an inoperable (or corrupted) server(s) (e.g., one or both servers 102a, 104a) and transmits this request to the BAG 202, which, in turn, provides the information stored in the backup vendor cache 204 and the backup vendor solution cache 206 to the restore API 208 so that the restore API 208 can restore the inoperable server(s) that triggered the request to the restore API 208.

Additionally, using the restore API 208, a user can view/change the information stored at the backup vendor cache 204, the backup vendor solution cache 206 of the BAG 202, and/or the storage 132. For example, a user may want to change hostname information of an inoperable server (e.g., one or both servers 102a, 104a) prior to that server being restored, such as when a replacement server is used in an out-of-place restoration of a server and a user wants to use a different hostname for the replacement server. Similarly, a user can query the BAG 202 using the restore API 208 to view other information stored in the backup vendor cache 204 and the backup vendor solution cache 206 (and or the storage 132), such as information relating to when a most recent backup of the servers 102a, 104a was performed.

The restore API 208 can restore the servers 102a, 104a associated with the backup vendors 102, 104 in-place or out-of-place. As used herein, in-place refers to restoring a server that is inoperable due to corruption or deletion of data and includes restoring that server to a point in time using a corresponding backup. For example, if the server 102a becomes inoperable, the server 102a is subsequently restored using a previously stored backup for the server 102a. Conversely, out-of-place refers to restoring a server that is inoperable due to destruction (e.g., fire), and includes restoring a different server to a point in time using a corresponding backup for the destroyed server. For example, if a first server 104a is destroyed, a second server 104a is updated (i.e., restored) using a previously stored backup for the first server 104a.

The restore API 208 can use the stored backup sets to restore the servers 102a, 104a to an environment corresponding to a particular date and time. For example, the server 102a can be restored to a first date and time (e.g., using a backup that was obtained a day ago from the backup vendor 102), and the server 104a can be restored to a second date and time (e.g., using a backup that was obtained from the backup vendor 104 a week ago).

Figure 3:
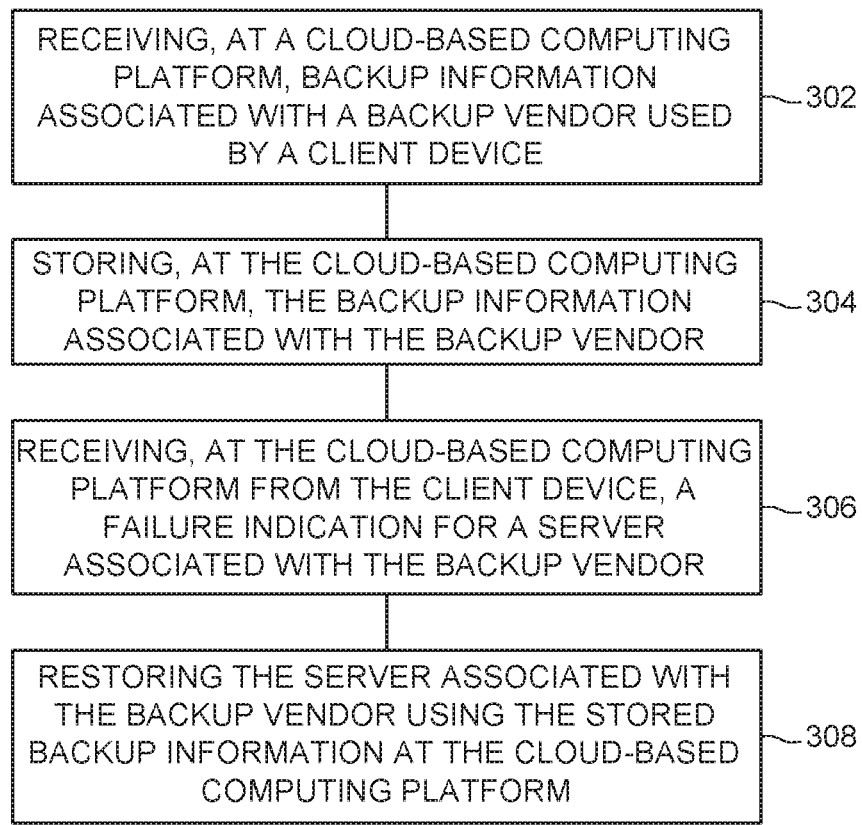
FIG. 3 is a flowchart of a method for cloud-based disaster recovery.

FIG. 3 depicts a flowchart of method for cloud-based disaster recovery, in accordance with an embodiment of the disclosure. It is assumed that all functions performed by the web-based application 200 are controlled by the cloud server 134.

Initially, the domain server 114 transmits a request to the restore API 208, and at 302 the BAG 202 begins receiving the backup information (e.g., the backup sets) for the backup vendors 102, 104 being used locally at the client machines 112; the backup information can include the names of the servers (e.g., servers 102a, 104a) associated with the backup vendors 102, 104 and the corresponding backup solutions, backup, backup sets, etc.

At 304, the BAG 202 complies a list of the backup vendors 102, 104 and their corresponding servers 102a, 104a and the backup sets of the backup vendors 102, 104, and stores the compilation in the backup vendor cache 204 and in the backup vendor solution cache 206, as described above.

Once the requisite information is provided to the BAG 202, the BAG 202 manages the various backup sets of the backup vendors 102, 104 and uses the managed backup sets to restore the servers 102a, 104a, if one should become inoperable.

For example, the BAG 202 requests, at one or more of the above-described polling intervals, that the backup vendors 102, 104 provide updates relating to the backup sets for the servers 102a, 104a. In response to the request, the BAG 202 receives the updated backups for the corresponding servers 102a, 104a from the backup vendors 102, 104. The received updated backups for the corresponding servers 102a, 104a are stored in the backup vendor solution cache 206 and replace the previous restored backups for the corresponding servers 102a, 104a. The previous restored backups for the servers 102a, 104a can be stored in the storage 132 for viewing by a user at the client domain 110, or simply deleted. In the former instance, the BAG 202 can store any number of previous restored backups for the servers 102a, 104a. For example, the BAG 202 can store 1, 2, 3, 4, and so on of previously restored backups for the servers 102a, 104*a*; the number of previously restored backups that the BAG 202 stores can depend on a user setting, storage capabilities of the storage 132, a manufacturer's preference, etc.

If one or both servers 102*a*, 104*a* should become inoperable (e.g., in-place or out-of-place), at 306 a failure indication is generated locally at the domain server 114 of the domain 110 and transmitted to and received at the restore API 208; generation/transmission of the failure indication can be performed automatically or manually—depending on a specific configuration of the web-based application 200, a particular reason that a server fails, etc. For example, failure of one or both servers 102*a*, 104*a* can automatically trigger the domain server 114 to generate the failure indication and transmit the failure indication to the restore API 208. Conversely, if the failure indication is sent manually (e.g., by a user) to the restore API 208, the user interface (mentioned previously), such as a GUI described below, can be provided at the client domain 110 (e.g., at the client machines 112) and used to receive a user input for requesting a manual restore of one of the servers 102*a*, 104*a* from the restore API 208.

Thereafter, at 308 the restore API 208 can request the BAG 202 to provide the most recent backup stored in the backup vendor solution cache 206 and can restore one or both servers 102*a*, 104*a* using the most updated backup stored in the backup vendor solution cache 206.

Figure 5:
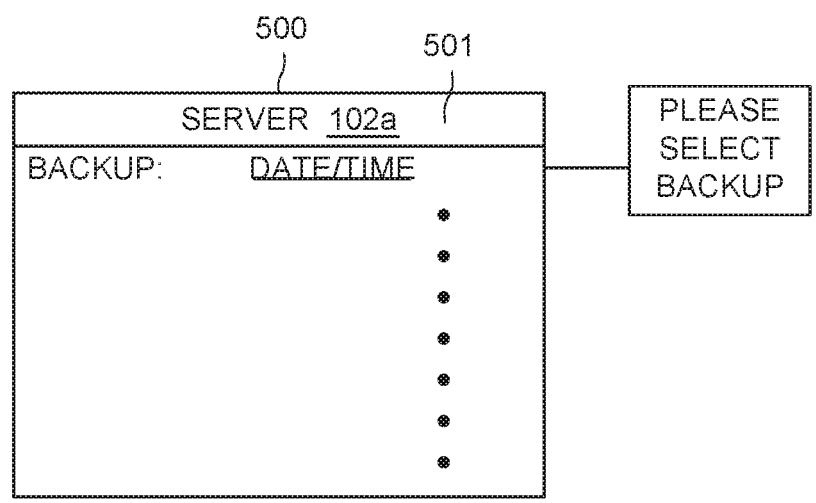
FIG. 5 is a diagram of a graphical user interface (GUI), in accordance with an embodiment of the disclosure.

Additionally, a user can request that the restore API 208 provide a listing of stored backup sets, e.g., if the user wants to perform a manual restore and/or choose a backup other than the most recently updated backup. For example, the restore API 208 can provide a user with one or more types of GUIs which can be displayed on a display of the client machines 112. For example, a GUI 500 (FIG. 5) can include any one of labels, text fields, buttons, text area, checkboxes, radio buttons, drop-down lists, etc. For illustrative purposes, the GUI 500 is shown including a text area 501 including an ID of an inoperable server (e.g., server 102*a*) and a drop-down list including a listing of the stored backup sets (including the most recently updated backup, which can be shown as the first backup) for the inoperable server, which can be selected by a user for restoring the inoperable server. The GUI 500 can be configured to receive a user input to perform one or more other functions described herein.

A system 100 that uses the methods described herein can restore inoperable servers in a relatively quick manner, when compared to conventional methods used to restore inoperable servers. More particularly, since the stored/updated backup sets for corresponding backup vendors are readily available at the BAG 202, the restore API 208 is not required to query each individual backup vendor for the most recent backup when a server becomes inoperable. Furthermore, the BAG 202 allows a user to track changes in the backup information in a common manner regardless of the backup solution(s).

Figure 4:
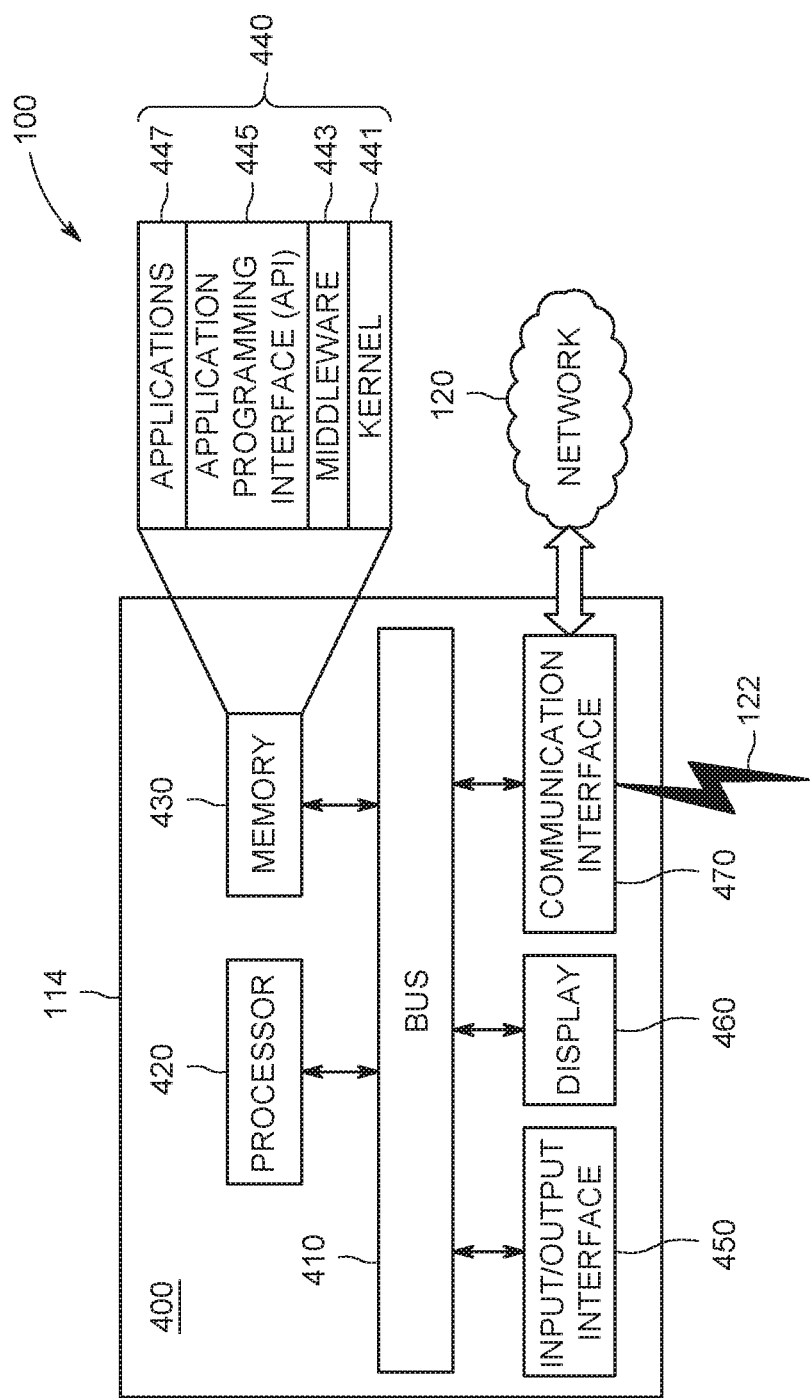
FIG. 4 is a diagram of an electronic device, in accordance with an embodiment of the disclosure.

FIG. 4 is a diagram of an electronic device, in accordance with an embodiment of the disclosure. The electronic device can perform the above-described functions and processes of the client machines 112, the client server 114, and/or the cloud server 134.

The electronic device 400 includes a bus 410, a processor or controller 420, a memory 430 (or storage, e.g., the storage 132), an input/output interface 450, a display 460, and a communication interface 470. At least one of the above-described components may be omitted from the electronic device 400 or another component may be further included in the electronic device 400.

The bus 410 may be a circuit connecting the above-described components 420, 430, 450, 460, and 470 and transmitting communications (e.g., control messages and/or data) between the above-described components.

The processor 420 may include one or more of a central processing unit (CPU), an application processor (AP), and a communication processor (CP). The processor 420 can control at least one of the other components of the electronic device 400 and/or processing data or operations related to communication.

The memory 430 may include volatile memory and/or non-volatile memory. The memory 430 can store data or commands/instructions related to at least one of the other components of the electronic device 400. The memory 430 can store software and/or a program module 440 (e.g., web-based application 200). For example, the program 440 may include a kernel 441, middleware 443, an API 445 (e.g., a restore API 208), application programs 447 (or applications, e.g., web-based application 200). The kernel 441, the middleware 443 or at least part of the API 445 may be called an operating system.

The kernel 441 can control or managing system resources (e.g., the bus 410, the processor 420, the memory 430, etc.) used to execute operations or functions of other programs (e.g., the middleware 443, the API 445, and the applications 447). The kernel 441 provides an interface capable of allowing the middleware 443, the API 445, and the applications 447 to access and control/manage the individual components of the electronic device 400.

The middleware 443 may be an interface between the API 445 or the applications 447 and the kernel 441 so that the API 445 or the applications 447 can communicate with the kernel 441 and exchange data therewith. The middleware 443 is capable of processing one or more task requests received from the applications 447. The middleware 443 can assign a priority for use of system resources of the electronic device 400 (e.g., the bus 410, the processor 420, the memory 430, etc.) to the application 447. The middleware 443 processes one or more task requests according to a priority assigned to at least one application program, thereby performing scheduling or load balancing for the task requests. For example, in the event of one of the servers 102*a*, 104*a* becoming inoperable, the middleware 443 can assign a high priority for the tasks required to restore the servers 102*a*, 104*a* to an operation state.

The API 445 may be an interface that is configured to allow the applications 447 to control functions provided by the kernel 441 or the middleware 443. The API 445 may include at least one interface or function (e.g., instructions) for file control, window control, image process, text control, or the like. For example, during a restore operation, the API 445 allows the applications 447 to display one or more user interfaces that allow a user to navigate through the BAG 202 of web-based application 200 to enter the above-described information associated with the backup vendors 102, 104.

The input/output interface 450 is capable of transferring instructions or data, received from the user or external devices, to one or more components of the electronic device 101. The input/output interface 450 is capable of outputting instructions or data, received from one or more components of the electronic device 400, to the user or external devices. The input/output device 450 can be configured to create one or more GUIs for receiving a user input, as described above.

The display 460 may include a liquid crystal display (LCD), a flexible display, a transparent display, a light emitting diode (LED) display, an organic LED (OLED) display, micro-electro-mechanical systems (MEMS) display, an electronic paper display, etc. The display 460 can display various types of content (e.g., texts, images, videos, icons, symbols, etc.). The display 460 may also be implemented with a touch screen. The display 460 can receive touches, gestures, proximity inputs or hovering inputs, via a stylus pen, or a user's body. Accordingly, the display 450 can be used to receive a user input on one or more GUIs, e.g., the GUI 500.

The communication interface 470 can establish communication between the electronic device 400 and an external device (e.g., backup vendors 102, 104) connected to the network 120 via wired or wireless communication.

Wireless communication may employ, as cellular communication protocol, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communication (GSM). Wireless communication may also include short-wireless communication 122. Short-wireless communication 122 may include at least one of wireless fidelity (Wi-Fi), Bluetooth (BT), near field communication (NFC), magnetic secure transmission (MST), etc. Wired communication may include at least one of universal serial bus (USB), high definition multimedia interface (HDMI), recommended standard 232 (RS-232), and plain old telephone service (POTS). The network 120 may include at least one of a telecommunications network, e.g., a computer network (e.g., local area network (LAN) or WAN), the Internet, and a telephone network.

While the domain server 114 and the cloud server 134 have been described herein as communicating with the backup vendors 102, 104 over the network 120, the disclosure is not so limited. For example, one or both of the domain server 114 and the cloud server 134 can communicate with each other and/or the backup vendors 102, 104 over the short-wireless communication 122.

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

Furthermore, while the methods described herein have been described for use with the cloud-based computing platform 130, the disclosure is not so limited. For example, the methods described herein can be performed locally using the client server 114 in the client domain 110. Additionally, one or more of the sequences in the methods described herein can be omitted, or one or more sequences not herein described can be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method for cloud-based disaster recovery, the method comprising:
   receiving, at a cloud-based computing platform, backup information associated with backup vendors used by a client machine, wherein the backup information associated with the backup vendors comprises at least one of a size of a previous restore of the server, an outcome of a previous restore of the server, a type of restore of a previous restore of the server, or a time required to complete a restore using a backup;
   storing, at the cloud-based computing platform, the backup information associated with the backup vendors;
   periodically updating, at the cloud-based computing platform, the backup information associated with each of the backup vendors at a predetermined polling interval for each of the backup vendors;
   receiving, at the cloud-based computing platform from the client machine, a failure indication for a server associated with at least one of the backup vendors; and
   restoring the server using the stored backup information at the cloud-based computing platform.

2. The method of claim 1, wherein the backup information associated with the backup vendor further comprises a backup for the server.

3. The method of claim 2, wherein the backup is a clone of data that was present on the server prior to the failure indication for the server being received at the cloud-based computing platform.

4. The method of claim 1, wherein the backup information further comprises at least one of:
   network information of the server;
   hostname information of the server; and
   type information of the server.

5. The method of claim 1, wherein the backup information further comprises a date of a previous restore of the server, and
   wherein the type of restore of the previous restore of the server comprises at least one of whether the restore was in-place or out-of-place or whether a backup is incremental, differential, full, application based, is for a virtual machine, or is for an operating system.

6. The method of claim 1, wherein the predetermined polling interval is different for each of the servers.

7. The method of claim 1, wherein the predetermined polling interval is the same for each of the servers.

8. The method of claim 1, wherein restoring the server comprises at least one of a restore application programming interface of the cloud-based computing platform selecting the stored backup information or a user selecting the stored backup information.

9. A nontransitory computer readable storage medium having stored thereon instructions that when executed by a processor perform a method for cloud-based disaster recovery, the method comprising:
   receiving, at a cloud-based computing platform, backup information associated with backup vendors used by a client machine, wherein the backup information associated with the backup vendors comprises at least one of a size of a previous restore of the server, an outcome of a previous restore of the server, a type of restore of a previous restore of the server, or a time required to complete a restore using a backup;
   storing, at the cloud-based computing platform, the backup information associated with the backup vendors;

periodically updating, at the cloud-based computing platform, the backup information associated with each of the backup vendors at a predetermined polling interval for each of the backup vendors;

receiving, at the cloud-based computing platform from the client machine, a failure indication for a server associated with at least one of the backup vendors; and restoring the server using the stored backup information at the cloud-based computing platform.

10. The nontransitory computer readable storage medium of claim 9, wherein the backup information associated with the backup vendor further comprises a backup for the server.

11. The nontransitory computer readable storage medium of claim 10, wherein the backup is a clone of data that was present on the server prior to the failure indication for the server being received at the cloud-based computing platform.

12. The nontransitory computer readable storage medium of claim 11, wherein the backup information further comprises at least one of:
network information of the server;
hostname information of the server; and
type information of the server.

13. The nontransitory computer readable storage medium of claim 9, wherein the backup information further comprises a date of a previous restore of the server, and wherein the type of restore of the previous restore of the server comprises at least one of whether the restore was in-place or out-of-place or whether a backup is incremental, differential, full, application based, is for a virtual machine, or is for an operating system.

14. The nontransitory computer readable storage medium of claim 9, wherein the predetermined polling interval is different for each of the servers.

15. The nontransitory computer readable storage medium of claim 9, wherein the predetermined polling interval is the same for each of the server.

16. A cloud-based server of a cloud-based computing platform comprising:
a processor; and
a memory coupled to the processor and having stored thereon instructions that when executed by the processor configure the cloud-based server to:

receive, at a cloud-based computing platform, backup information associated with backup vendors used by a client machine, wherein the backup information associated with the backup vendors comprises at least one of a size of a previous restore of the server, an outcome of a previous restore of the server, a type of restore of a previous restore of the server, or a time required to complete a restore using a backup;

store, at the cloud-based computing platform, the backup information associated with the backup vendors;

periodically update, at the cloud-based computing platform, the backup information associated with each of the backup vendors at a predetermined polling interval for each of the backup vendors;

receive, at the cloud-based computing platform from the client machine, a failure indication for a server associated with at least one of the backup vendors; and restore the server using the stored backup information at the cloud-based computing platform.

17. The cloud-based server of claim 16, wherein the backup information associated with the backup vendor further comprises a backup for the server.

18. The cloud-based server of claim 17, wherein the backup is a clone of data that was present on the server associated with the backup vendor prior to the failure indication being received at the cloud-based server.

19. The cloud-based server of claim 18, wherein the backup information further comprises at least one of:
network information of the server associated with the backup vendor;
hostname information of the server associated with the backup vendor; and type information of the server associated with the backup vendor.

20. The cloud-based server of claim 16, wherein the backup information further comprises a date of a previous restore of the server, wherein the type of restore of the previous restore of the server comprises at least one of whether the restore was in-place or out-of-place or whether a backup is incremental, differential, full, application based, is for a virtual machine, or is for an operating system, and wherein the predetermined polling interval is one of different for each of the servers or the same for each of the servers.

* * * * *